US009377587B2

(12) United States Patent
Taylor et al.

(10) Patent No.: US 9,377,587 B2
(45) Date of Patent: Jun. 28, 2016

(54) FIBER OPTIC COUPLER ARRAY

(71) Applicants: The University of Connecticut Technology Partnerships & Licensing, Farmington, CT (US); Opel Solar, Inc., Storrs Mansfield, CT (US)

(72) Inventors: Geoff W. Taylor, Storrs-Mansfield, CT (US); Yan Zhang, Coventry, CT (US)

(73) Assignees: THE UNIVERSITY OF CONNECTICUT TECHNOLOGY PARTNERSHIP & LICENSING, Farmington, CT (US); Opel Solar, Inc., Storrs Mansfield, CT (US)

( * ) Notice: Subject to any disclaimer, the term of this patent is extended or adjusted under 35 U.S.C. 154(b) by 188 days.

(21) Appl. No.: 14/104,230

(22) Filed: Dec. 12, 2013

(65) Prior Publication Data
US 2015/0316723 A1    Nov. 5, 2015

Related U.S. Application Data

(60) Provisional application No. 61/736,768, filed on Dec. 13, 2012.

(51) Int. Cl.
| G02B 6/30 | (2006.01) |
| G02B 6/14 | (2006.01) |
| G02B 6/42 | (2006.01) |
| G02B 6/122 | (2006.01) |

(52) U.S. Cl.
CPC ............. *G02B 6/305* (2013.01); *G02B 6/1228* (2013.01); *G02B 6/14* (2013.01); *G02B 6/421* (2013.01); *G02B 6/423* (2013.01); *G02B 6/4249* (2013.01); *G02B 6/4257* (2013.01)

(58) Field of Classification Search
CPC .................................. G02B 6/30; G02B 6/305
See application file for complete search history.

(56) References Cited

U.S. PATENT DOCUMENTS

| 5,432,338 | A |   | 7/1995 | Bossler | |
|---|---|---|---|---|---|
| 5,703,980 | A | * | 12/1997 | MacElwee | ............... G02B 6/30 385/30 |
| 5,907,649 | A | * | 5/1999 | Acklin | ................... G02B 6/423 385/14 |
| 5,930,423 | A | * | 7/1999 | Chen | ...................... G02B 6/305 385/38 |
| 6,031,243 | A |   | 2/2000 | Taylor | |
| 6,479,844 | B2 |   | 11/2002 | Taylor | |
| 6,633,705 | B2 | * | 10/2003 | Ambrosy | ................. G02B 6/02 385/41 |

(Continued)

FOREIGN PATENT DOCUMENTS

WO      WO 02/071490        9/2002

*Primary Examiner* — Daniel Petkovsek
(74) *Attorney, Agent, or Firm* — Sughrue Mion, PLLC

(57) ABSTRACT

An assembly includes optical fibers each having a waveguide core, a photonic integrated circuit (IC) that includes in-plane waveguides corresponding to the optical fibers, and a substrate bonded to the photonic IC with grooves that support the optical fibers. The substrate and photonic IC can have metal bumps that cooperate to provide mechanical bonding and electrical connections between the substrate and photonic IC. Portions of the optical fibers supported by the substrate grooves can define flat surfaces spaced from the optical fiber cores. The photonic IC can include passive waveguide structures with a first coupling section that interfaces to the flat surface of a corresponding optical fiber (for evanescent coupling of optical signals) and a second coupling section that interfaces to a corresponding in-plane waveguide (for adiabatic spot-size conversion of optical signals).

15 Claims, 5 Drawing Sheets

(56) References Cited

U.S. PATENT DOCUMENTS

| | | | |
|---|---|---|---|
| 6,841,795 B2 | 1/2005 | Taylor et al. | |
| 6,849,866 B2 | 2/2005 | Taylor | |
| 6,853,014 B2 | 2/2005 | Taylor et al. | |
| 6,870,207 B2 | 3/2005 | Taylor | |
| 6,873,273 B2 | 3/2005 | Taylor et al. | |
| 6,879,757 B1 | 4/2005 | Zhou et al. | |
| 6,954,473 B2 | 10/2005 | Dehmubed et al. | |
| 6,995,407 B2 | 2/2006 | Taylor et al. | |
| 7,079,727 B1 * | 7/2006 | Little | G02B 6/132 385/130 |
| 7,088,090 B2 | 8/2006 | Staats | |
| 7,303,339 B2 * | 12/2007 | Zhou | G02B 6/136 385/91 |
| 7,332,752 B2 | 2/2008 | Taylor et al. | |
| 7,379,638 B2 | 5/2008 | Blauvelt et al. | |
| 7,551,826 B2 | 6/2009 | Taylor | |
| 7,603,021 B2 * | 10/2009 | Watanabe | G02B 6/30 385/137 |
| 8,320,721 B2 * | 11/2012 | Cevini | G02B 6/1228 385/131 |
| 8,326,099 B2 | 12/2012 | Singer et al. | |
| 8,483,528 B2 * | 7/2013 | Socci | G02B 6/1228 385/131 |
| 2003/0053756 A1 * | 3/2003 | Lam | G02B 6/1228 385/49 |

* cited by examiner

FIBER OPTIC COUPLER ARRAY

CROSS-REFERENCE TO RELATED APPLICATIONS

The present application claims priority from U.S. Provisional Appl. No. 61/736,768, filed on Dec. 13, 2012, herein incorporated by reference in its entirety.

BACKGROUND

1. Field

The present application is related to waveguide input and output couplers for optical integrated circuits.

2. State of the Art

Waveguide input and output couplers have always been an important issue in optical integrated circuit design. Various coupling schemes have been proposed or demonstrated to overcome the low coupling efficiency between the optical fiber and the waveguides on the chip. Based on the direction at which light is coupled in or out of the waveguides, these schemes fall into one of two categories: vertical coupling (out of plane) and lateral coupling (in plane).

Vertical coupling is typically accomplished with diffractive gratings incorporated into a waveguide layer to provide a conversion between the optical mode in the single-mode fiber (SMF) and the waveguide. The vertical coupling scheme typically requires the fiber to be positioned at some angle to the wafer. Multiple fiber I/O is possible. The drawbacks are that the diffractive nature of this approach relies on interferometric behavior applicable only to a limited wavelength range and therefore may not be suitable for large-spectral bandwidth optical coupling. It also has strong polarization dependence.

In lateral coupling, light is coupled in and out of an exposed cross-section of the waveguide in the lateral direction and this has always been reported in a butt coupling configuration. Typically a lens or a spot-size converter (SSC) is needed for the mode conversion between the fiber and the waveguide. Multichannel coupling of waveguide to fiber arrays has been demonstrated. While the lateral coupling has weak polarization dependence and is insensitive to the input bandwidth, it puts a stringent demand on the alignment of the fiber both vertically and laterally. Also, SSC designs require excellent control of the critical dimensions and lensed fiber or special fiber are often needed for nano-waveguides especially when implemented for short wavelength, which adds to the cost and complicates the fabrication and packaging of the integrated circuits.

SUMMARY OF THE INVENTION

An optical fiber coupler array assembly includes a plurality of optical fiber waveguides each having a waveguide core, a photonic integrated circuit (IC) that includes a plurality of in-plane waveguide structures corresponding to the plurality of optical fiber waveguides, and a substrate that is bonded to the photonic ICt. The substrate includes a plurality of grooves that support the optical fiber waveguides. The substrate and the photonic IC can both have metal bump bonds that cooperate to provide mechanical bonding and electrical connections between the substrate and the photonic IC.

Portions of the optical fiber waveguides that are supported by the grooves of the substrate can define a corresponding plurality of flat surfaces that are spaced from the waveguide cores of the optical fiber waveguides, and the photonic IC can include a plurality of passive waveguide structures that correspond to both the plurality of in-plane waveguide structures of the photonic IC and the plurality of optical fiber waveguides. Each passive waveguide structure can include a first coupling section that interfaces to the flat surface of the corresponding optical fiber waveguide and a second coupling section that interfaces to the corresponding in-plane waveguide structure of the photonic IC. The first coupling section can be configured to provide for evanescent coupling of optical signals into or from the corresponding optical fiber waveguide, and the second coupling section can be configured to provide for adiabatic spot-size conversion of optical signals between the first coupling section and the corresponding in-plane waveguide structure of the photonic IC.

In one embodiment, the waveguide cores of the optical fiber waveguides are realized from a material with a first refractive index, and the first coupling section and the second coupling section of the passive waveguide structures of the photonic IC are realized from a material with a second refractive index that matches the first refractive index.

In another embodiment, the waveguide cores of the optical fiber waveguides are realized from silicon dioxide, and the first coupling section and the second coupling section of the passive waveguide structures of the photonic IC are also realized silicon dioxide.

In yet another embodiment, the first coupling section of each respective passive waveguide structure has a square cross section with a size that corresponds to size of the optical mode of the corresponding optical fiber waveguide.

In still another embodiment, the second coupling section of each respective passive waveguide structure defines a number of distinct levels that overlap one another vertically along the length of the second coupling section, wherein each level has opposed sidewalls that taper laterally in width. In one exemplary configuration, the second coupling section includes bottom, intermediate and top levels that extend along the length of the second coupling section, wherein the top level has a height that corresponds to height of the first coupling section and opposed sidewalls that taper laterally from a width $W_I$ that corresponds to width of the first coupling section to a width $W_1$, wherein the second level has a portion that extends beyond the top level with opposed sidewalls that taper laterally from a width $W_M$ to a width $W_2$ adjacent the corresponding in-plane waveguide structure, wherein the third level has a portion that extends beyond the top level with opposed sides that taper laterally from the width $W_M$ to a width $W_O$, and wherein $W_2 < W_1 < W_M < W_I$ and $W_O < W_M$.

The photonic IC can be realized with a material system of group III-V materials. The photonic IC can also be realized from an epitaxial layer structure that includes an n-type modulation doped quantum well interface offset vertically from a p-type modulation doped quantum well interface.

DETAILED DESCRIPTION OF THE PREFERRED EMBODIMENTS

Figure 1:
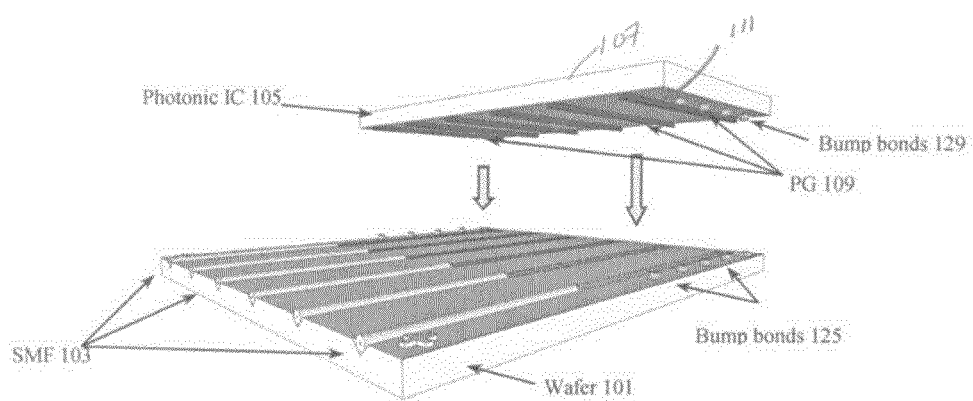
FIG. 1 is a schematic exploded view of a fiber optic coupler array according to the present application.
Figure 3:
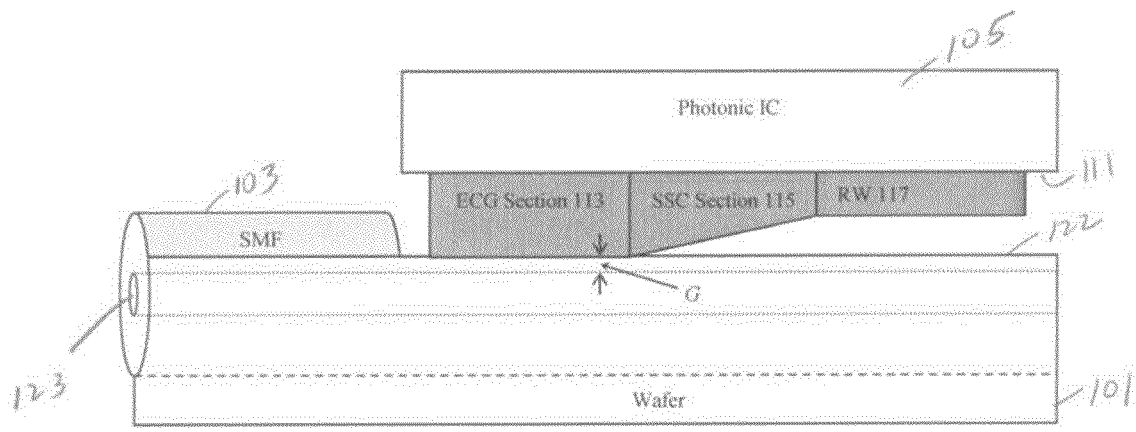
FIG. 3 is a schematic cross-sectional view of the interface between the passive semiconductor waveguide (PG) of the photonic integrated circuit and the flat surface of a single-mode optical fiber (SMF) supported by the wafer of the fiber optic coupler array of FIG. 1.
Figure 6:
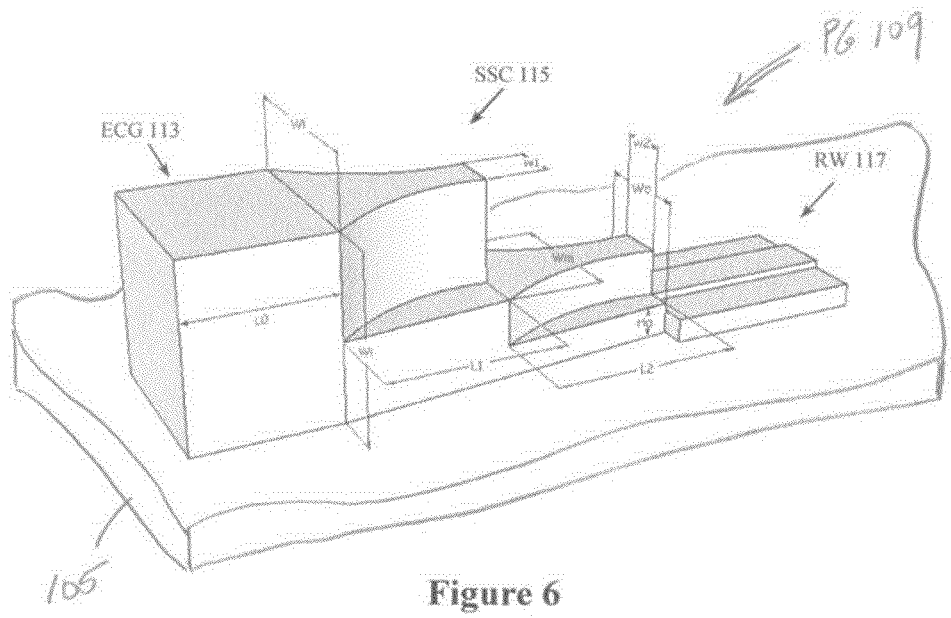
FIG. 6 is a schematic isometric view of an exemplary configuration of the passive semiconductor waveguide (PG) and the rib waveguide of the photonic integrated circuit of FIGS. 1 and 3.

FIG. 1 illustrates a fiber optic coupler array 100 according to the present application. The coupler array 100 includes two parts: a wafer 101 that mechanically supports a plurality of single-mode optical fibers (SMFs) 103; and a photonic integrated circuit (IC) 105 with active electro-optical components that are operably coupled to the SMFs 103 supported by the wafer 101. The SMFs 103 can extend beyond the periphery of the wafer 101 for connection to other network components as needed. The photonic IC 105 is configured in an inverted configuration (with the substrate 107 up) with on-chip passive semiconductor waveguides (PG) 109 integral to its top surface 111 (opposite the substrate 107). Each PG 109 is configured such that is in intimate contact with a corresponding SMF 103 in which the fiber cross-section has been suitably modified to provide evanescent-wave coupling between the SMF 103 and the PG 109. As best shown in FIGS. 3 and 6, each PG 109 includes an evanescent coupling guide (ECG) section 113 and a spot-size converter (SSC) section 115. The ECG section 113 interfaces to the SMF 103 and provides evanescent-wave coupling to the SMF 103. The SSC section 115 interfaces to a rib waveguide 117 that is integral to the top surface 111 of the photonic IC 105 and provides low-loss adiabatic spot-size conversion of optical signals between the rib waveguide 117 and the evanescent coupling guide (ECG) section 113. There is one rib waveguide 117 corresponding to a particular SMF 103 with a corresponding PG 109 (ECG section 113 and SSC section 115) coupled therebetween. The ECG section 113 and SSC section 115 of the respective PG 109 provide optical coupling and mode conversion of optical signals between the SMF 103 and the RW 117 of the corresponding SMF/RW pair.

This design has the following advantages. First, it is naturally suitable for a multiple fiber-waveguide interface to achieve low cost. Second, the alignment for both vertical and lateral directions can be well controlled. Third, it can be fabricated using standard techniques so that high demands on critical dimensions can be relaxed. Although the design has been performed for photonic integrated circuits based on Planar Opto-electronic Technology as noted below, it can be readily adapted to photonic integrated circuits utilizing any semiconductor waveguide.

Figure 2:
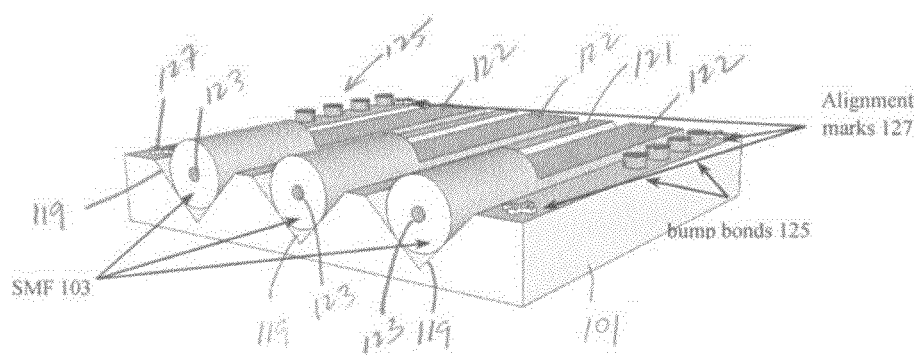
FIG. 2 is a schematic partial isometric view of the wafer part of the fiber optic coupler array of FIG. 1.

According to one embodiment of the present application, the wafer 101 is prepared to hold the SMFs 103 as shown in FIG. 2. First, a set of grooves 119 (which can have a V-shaped cross-section) are formed on one surface of the wafer 101 (i.e., the top surface 121 of FIG. 2) using standard techniques. The grooves 119 can extend parallel to one another as shown. There is one groove 119 for each SMF 103. The SMFs 103 are placed into the grooves 119 and mechanically fixed therein by the injection of an index-matching gel (not shown in FIG. 2). The SMFs 103 each have a core 123 that is surrounded by cladding material that traps the light in the core 123 using an optical technique called total internal reflection. The cladding material of each SMF 103 can be coated by a buffer (not shown) that protects the cladding and core from moisture and physical damage. The depth of the grooves 119 are configured by lithography (such as by the fixed etch angle for the grooves) so that the cores 123 of the SMFs 103 lie about 1 µm below the surface 121 of the wafer 101 as best shown in FIG. 3. Then, with the SMFs 103 positioned in the grooves 119, portions of the SMFs 103 supported in the grooves 119 (particularly, the top cladding material of supported portions of the SMFs 103) are removed by polishing down to the surface 121 of the wafer 101 to define flat surfaces 122 of the SMFs 103 that are approximately 1 µm radially above the respective cores 123 of the SMFs 103. The flat surfaces 122 of the SMFs 103 also extend parallel to the respective cores 123 along the lengthwise dimension of the SMFs 103 as best shown in FIGS. 2 and 3. The surface 121 of the wafer 101 also includes a predetermined number of metal bumps 125 (for example, eight shown) and a predetermined number of alignment marks 127 (for example, four shown). The metal bumps 125 are preferably disposed about the periphery of the surface 121 of the wafer 101 as shown. The alignment marks 127 are preferably disposed about the periphery of the surface 121 of the wafer 101, for example adjacent the four corners of the surface 121 as shown. The metal bumps 125 of the wafer 101 are positioned to contact and bond to corresponding metal bumps 129 disposed on the top surface 111 of the photonic IC 105 as best shown in FIG. 1. The alignment marks 127 are used to align the wafer 101 to the photonic IC 105 such that the corresponding metal bumps contact one another for bonding purposes. The wafer 101 can be silicon or other suitable substrate. The metal bumps 125 can be realized from Indium. The metal bumps 125 of wafer 101 connect to through-substrate metal vias (TSVs, not shown) that extend through the wafer 101 to the opposed back surface. The back surface of the wafer 101 is mounted to a printed circuit board (PCB, not shown). The TSVs are electrically coupled to metal traces on the PCB by suitable surface mount packaging technology (such as a pin grid array or ball grid array package) for off-chip electrical I/O. Other ICs can be mounted on the PCB.

The surface 111 of the photonic IC 105 (depicted as the bottom surface of the inverted configuration of FIGS. 1 and 3) includes rib waveguides (RW) 117 that guide optical signals in the plane of the photonic IC 105. There is one RW 117 for each SMF 103. The RW 117 can be part of a passive optical device (e.g., passive waveguide) or an active optoelectronic device (e.g., a laser, detector or coupler switch) realized as part of the photonic IC 105. The surface 111 of the photonic IC 105 also includes a predetermined number of metal bumps 129 (for example, eight shown). The metal bumps 129 are preferably realized from Indium. The metal bumps 129 are preferably disposed about the periphery of the surface 111 of the photonic IC 105 as shown. The metal bumps 129 are positioned to contact and bond to the corresponding metal bumps 125 of the wafer 101. The surface 111 of the photonic IC 105 also includes alignment marks (not shown), which are used to align the photonic IC 105 to the wafer 101 such that the corresponding metal bumps 125/129 contact one another for bonding purposes. The metal bumps 129 of the photonic IC 105 are electrically coupled to electro-optical components (or electrical components) of the photonic IC 105 by vias and/or other metal/conductor interconnect schemes for electrical I/O.

The photonic IC 105 is flipped upside down (substrate up) and bonded to the wafer 101 with the help of the alignment marks on both parts. The bonding is performed with the use of the corresponding metal bumps 125, 129, which are also utilized at the same time to perform electrical connections to the bump bonds 129 around the edge of the photonic IC 105. In this way, the electrical connections are performed simultaneously with the optical connections. More specifically, when the metal bumps 129 of the photonic IC 105 are bonded to the corresponding metal bumps 125 of the wafer 101, the TSVs and back side packaging technology of the wafer 101 are electrically coupled to the electro-optical components (or electrical components) of the photonic IC 105 to provide for electrical I/O over the metal traces of the PCB with the electro-optical components (or electrical components) of the photonic IC.

With the photonic IC 105 bonded to the wafer 101, the bottom surface of the ECG section 113 of each respective PG 109 interfaces to the polished surface 122 of the corresponding SMF 103 and provides evanescent-wave coupling to the SMF 103. Specifically, the optical signal in each SMF 103 is coupled into the ECG section 113 of the corresponding PG 109 (or vice versa) by evanescent coupling between the core 123 of the SMF 103 (which is disposed under the polished surface 122 of the SMF 102) and the ECG section 113 of the PG 109 (which is positioned above the core 123 of the SMF 103) as best shown in FIG. 3. Evanescent coupling is a process by which electromagnetic waves are transmitted from one medium to another by means of an evanescent, exponentially decaying electromagnetic field. Such evanescent coupling can be examined in BeamPROP, a commercial 3D photonic simulation tool based on BPM method. It was found that the refractive index of the material of the ECG section 113 (as well as the refractive index of the material of the SSC section 115) should be the same as that of the material of the core 123 of the SMF 103 for maximum power transfer efficiency. Therefore, in the event that the core of the SMF 103 is realized from $SiO_2$, then $SiO_2$ can be used to form the corresponding ECG section 113 and the SSC section 115 of the photonic IC 105.

Figure 4:
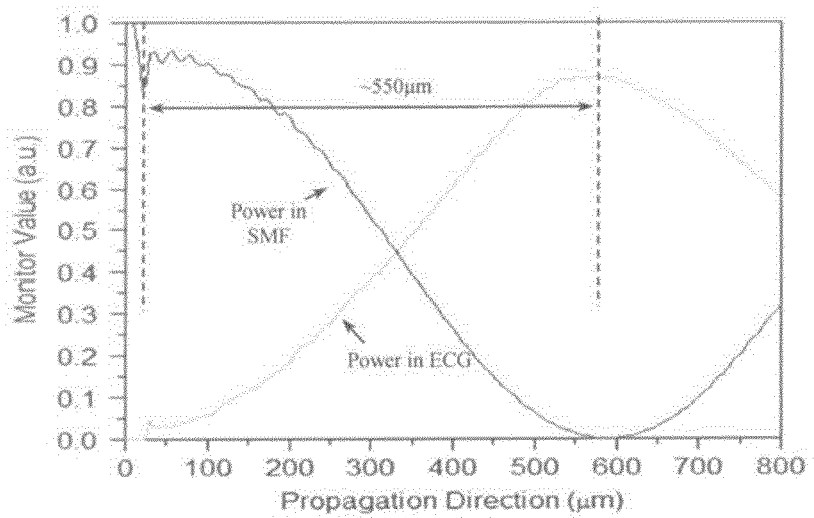
FIG. 4 is a plot showing the power of the optical signal in the SMF and the power of the optical signal in the evanescent coupling guide section of the semiconductor waveguide (PG) of the photonic integrated circuit of FIGS. 1 and 3 as a function of propagation distance along the length of the evanescent coupling guide section of the semiconductor waveguide (PG) of the photonic integrated circuit.

In one embodiment, the cross section of the ECG section 113 can be a square shape as shown in FIG. 6, with an edge length $W_i$ determined to be ~6 μm to obtain a mode comparable in size to a standard SMF at a wavelength of 980 nm. For the case where the spacing G between the ECG section 113 and the core 123 of the SMF 103 as shown in FIG. 3 is 1 μm, the length L0 of the ECG section 113 can be ~550 μm. This configuration can maximize power transfer between the SMF 103 and the ECG section 113 of the PG 109 as evident from FIG. 4. The length L0 of the ECG section 113 (in this example, ~550 μm) is also selected to establish a stable propagating mode in the ECG section 113. The efficiency of the optical power transferred from the SMF 103 to the ECG section 113 peaks at 87% which corresponds to a loss of ~0.6 dB. Such loss can be attributed to the portion of the SMF 103 polished away to provide the interface surface 122 of the SMF 103. The optical mode coupled into the ECG section 113 (or vice versa) has a mode field diameter (MFD) that matches the MFD of the SMF 103, which is ~5 μm.

Figure 5A:
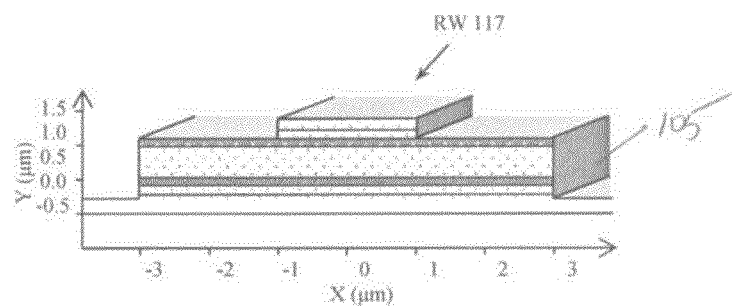
FIG. 5A is a schematic cross-sectional view of an exemplary configuration of the rib waveguide that is part of the photonic integrated circuit of FIG. 1.
Figure 5B:
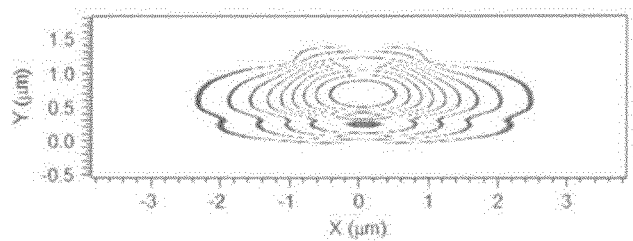
FIG. 5B is a plot of the profile of the fundamental (TE) mode of the exemplary rib waveguide of FIG. 5A.

An exemplary embodiment of the rib waveguides 117 of the photonic IC 105 into which the optical signal is coupled (or vice versa) is shown in cross-section in FIG. 5A. The profile of the fundamental (TE) mode of the RW 117 is shown in FIG. 5B, with an effective index of ~3.356. Since the size of this mode is smaller than the one in the ECG section 113, the SSC section 115 is needed to perform adiabatic spot-size conversion between the MFD of the ECG section 113 (e.g., ~5 μm) and the smaller MFD of the RW 117 of the photonic IC 105.

An exemplary configuration of the SSC section 115 suitable for 980 nm is shown in FIG. 6 and was characterized using BeamPROP to determine its minimum length. It can also be formed by depositing and patterning $SiO_2$ on the top surface 111 of the photonic IC 105. It has three levels (over its height from top to bottom) that each perform adiabatic conversion of the optical mode. The first (top) level has a height of 1.9 μm, and has opposed sidewalls that taper laterally along the length L1 of 300 μm from an initial width Wi of 6 μm (the same width as the ECG) to a width w1 of 1 μm. The second (intermediate) level, which is disposed under the first level, has a height of 3 μm. For the section under the first level (corresponding to the length L1), the second level has opposed sidewalls that taper laterally from an initial width Wi of 6 μm (the same width as the ECG) to a width Wm of 5 μm. The second level continues with opposed sidewalls that taper laterally along the length L2 of 200 μm from the width Wm of 5 μm to a width w2 of 1 μm. The width Wm can vary and is preferably larger than 4 μm. The exemplary design employs a width Wm of 5 μm to achieve a linear lateral profile. The third (bottom) level, which is disposed under both the first and second level, has a height Ho of 1.1 μm. For the section under the first and second level (corresponding to the length L1), the third level has opposed sidewalls that taper laterally from an initial width Wi of 6 μm (the same width as the ECG) to a width Wm of 5 μm. It continues under the second section (corresponding to the length L2) with opposed sidewalls that taper laterally from the width Wm of 5 μm to a width Wo of 4 μm. These dimensions can be easily achieved by using standard lithographic techniques.

For optical signals entering the SSC section 115 from the ECG section 113, the lateral taper of the first level of the SSC section 115 narrows the width of the optical mode exiting the ECG section 113. The first level of the SSC section 115 also narrows the height of the optical mode exiting the ECG section 113 and couples it to the second level of the SSC section 115 disposed thereunder. The lateral taper of the second level of the SSC section 115 further narrows the width of optical mode. The second level of the SSC section 115 also further narrows the height of the optical mode and couples it to the third level disposed thereunder. The third level of the SSC section 115 further narrows the width and height of optical mode such that its size is compatible the size of the RW 117.

For optical signals entering the SSC section 115 from the RW 117, the operations are reversed to expand (widen) the optical mode in width and height such that its size is compatible with the ECG section 113 and the SMF 103 coupled thereto by evanescent coupling.

Figure 7:
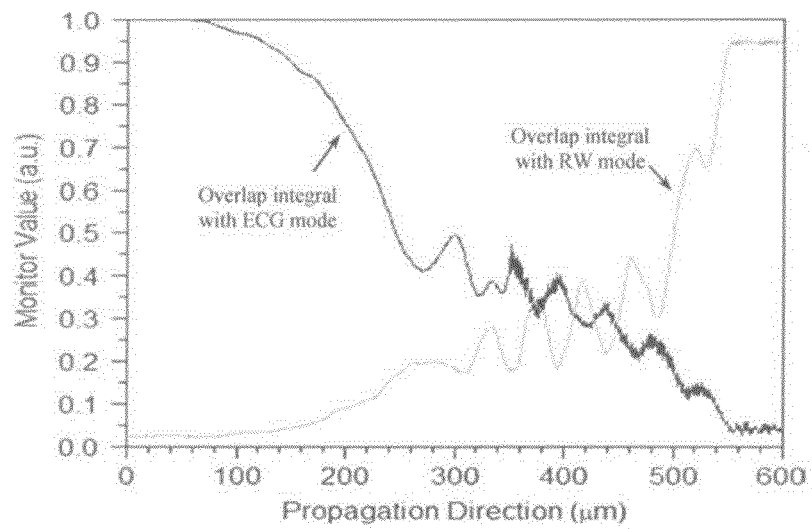
FIG. 7 is a plot showing the transfer of the optical signal between the evanescent coupling guide section of the semiconductor waveguide (PG) and the rib waveguide that results from simulation of the exemplary configuration of FIG. 6.

The performance of the SSC section 115 can be modeled by the BeamPROP simulation and the results for the overlap integral with the mode of the RW 117 (shown in FIG. 5B) and the mode of the ECG section 113 vs. propagation distance shown in FIG. 7. The efficiency of the SSC section 115 can be read from the figure as 96%, corresponding to a loss of only 0.18 dB, which can even further reduced if techniques capable of creating submicron features such as E-beam are used.

Figure 8:
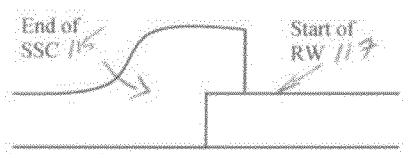
FIG. 8 is a schematic illustration of an exemplary interface between the spot-size converter section of the semiconductor waveguide (PG) and the rib waveguide in the exemplary configuration of FIG. 6.

The SSC section 115 as described above can be formed by deposition of $SiO_2$ on the top surface 111 of the photonic IC 105 after a section of the RW 117 is etched away. To avoid the formation of a gap between the SSC section 115 and the RW 117, extra $SiO_2$ will be deposited on the RW structure 117 as shown in FIG. 8.

Additional loss can occur at the interface between the SSC section and the RW section 117. The first additional loss is the reflection between the SSC section 115 and the RW 117 caused by different effective indices. Such reflection can be calculated as:

$$-10\log(1-R) = -10\log\left[1 - \left(\frac{n_1 - n_2}{n_1 + n_2}\right)^2\right] = -10\log\left[1 - \left(\frac{3.356 - 1.45}{3.356 + 1.45}\right)^2\right] = 0.74 \text{ dB} \quad (1)$$

in which R is the reflectivity at the interface and $n_1$ and $n_2$ are the effective indices for the local mode at the end of the SSC section 115 and that of the RW 117, respectively. The second additional loss is the diffraction loss caused by the rise of the $SiO_2$ layer adjacent the RW 117 as shown in FIG. 8, which can be estimated by simulation in BeamPROP to be ~0.15 dB. Based on the calculations above, the overall insertion loss of the coupler can be obtained as $$IL = IL_{SMF\text{-}ECG} + IL_{SSG} + IL_{SSC\text{-}RW} = 0.6 + 0.18 + (0.74 + 0.15) = 1.77 \text{ dB} \quad (2)$$

The total length of each respective PG is ~1 mm.

Figure 9:
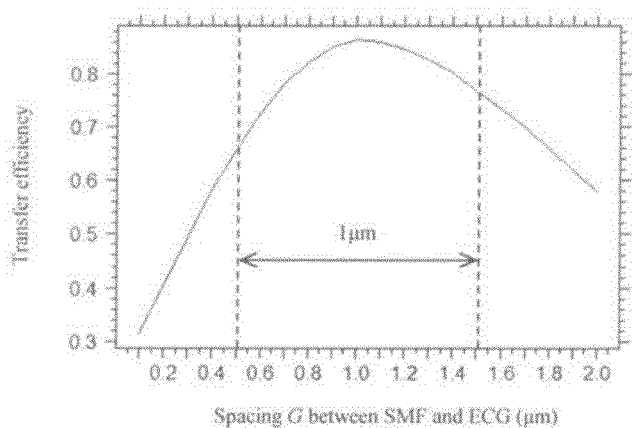
FIG. 9 is a plot showing exemplary transfer efficiency of the fiber optic coupler array of FIG. 1 as a function of the spacing G between the generally flat surfaces of the SMFs and the evanescent coupling guide section of the semiconductor waveguide (PG) of the photonic integrated circuit of FIGS. 1 and 3.

The performance of the fiber optic coupler array 100 as described herein can be modeled assuming perfect conditions assumed. In reality, there are misalignment issues which should be considered when evaluating the coupler performance. First, the spacing G between the polished surface 122 of the SMF 103 and the ECG section 113 shown in FIG. 3 determines the coupling coefficient between them and therefore the length of the ECG section 113. Moreover, when creating the grooves 119 on the wafer 101 and polishing the portions of the SMFs 103 down to the wafer surface, this spacing can be different from the designed value. FIG. 9 shows the transfer efficiency between a SMF 103 and ECG section 113 vs. spacing between them when the length of the ECG is 550 µm. When the spacing deviates −0.5 µm from the design value of 1 µm, the transfer efficiency changes from 86% to 66%; when the spacing is increased to 1.5 µm, the transfer efficiency changes to 76%.

Figure 10A:
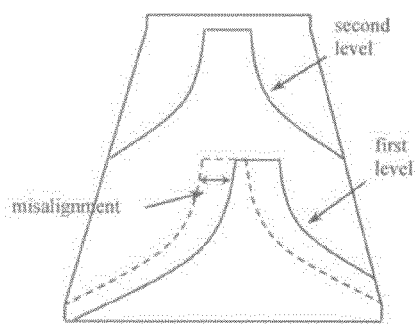
FIG. 10A is a schematic view depicting misalignment of the levels of the spot-size converter for the exemplary configuration of FIG. 6.
Figure 10B:
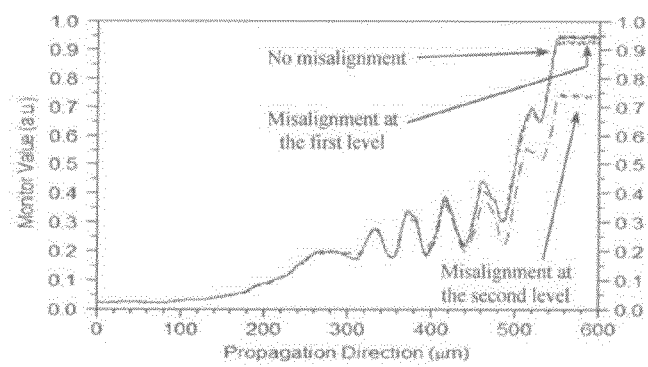
FIG. 10B is a plot that shows the power of the optical signal in the spot-size converter section for the exemplary configuration of FIG. 6 as a function of propagation distance along the length of the spot-size converter section for three cases: no misalignment of the first and second levels of the spot-size converter section, misalignment at the first level of the spot-size converter section; and misalignment at the second level of the spot-size converter section.

Second, mask misalignment is expected when standard lithography techniques are used. In terms of misalignment as shown in FIG. 10A, conversion efficiency is more sensitive to the second level misalignment than to the first level due to the fact that the overlap efficiency at the first interface is larger than that at the second. This is verified by the simulation results shown in FIG. 10b in which 1 µm misalignments of mask layers for the first and second level are introduced. While the misalignment at the first level has little effect on the conversion efficiency, the misalignment at the second level causes a loss of ~1.1 dB.

The design of the fiber optic coupler array 100 as described herein has a major advantage in that it is suited for manufacturing due to its inherently low cost.

The photonic IC 105 can include photonic devices that carry out one or more of a wide variety of active photonic functions, such as laser transmission, optical-to-electrical conversion, bidirectional transmission and optical-to-electrical conversion of optical signals, optical amplification, optical modulation, optical coupling and cross-connection, and other optical processing functions. The photonic devices of the photonic IC can also carry out a passive photonic function, such as passive optical waveguiding.

The photonic IC 105 can be preferably realized from a multilayer structure of group III-V materials that provides for monolithic integration of high speed transistor functionality, such as high-speed complementary HFET transistors and/or high-speed complementary bipolar transistors. In one embodiment, the photonic IC employs Planar Optoelectronic Technology (POET) that provides for the realization of a variety of devices (optoelectronic devices, logic circuits and/or signal processing circuits) utilizing inversion quantum-well channel device structures as described in detail in U.S. Pat. No. 6,031,243; U.S. patent application Ser. No. 09/556,285, filed on Apr. 24, 2000; U.S. patent application Ser. No. 09/798,316, filed on Mar. 2, 2001; International Application No. PCT/US02/06802 filed on Mar. 4, 2002; U.S. patent application Ser. No. 08/949,504, filed on Oct. 14, 1997, U.S. patent application Ser. No. 10/200,967, filed on Jul. 23, 2002; U.S. application Ser. No. 09/710,217, filed on Nov. 10, 2000; U.S. Patent Application No. 60/376,238, filed on Apr. 26, 2002; U.S. patent application Ser. No. 10/323,390, filed on Dec. 19, 2002; U.S. patent application Ser. No. 10/280,892, filed on Oct. 25, 2002; U.S. patent application Ser. No. 10/323,390, filed on Dec. 19, 2002; U.S. patent application Ser. No. 10/323,513, filed on Dec. 19, 2002; U.S. patent application Ser. No. 10/323,389, filed on Dec. 19, 2002; U.S. patent application Ser. No. 10/323,388, filed on Dec. 19, 2002; U.S. patent application Ser. No. 10/340,942, filed on Jan. 13, 2003; all of which are hereby incorporated by reference in their entireties. These device structures are built from an epitaxial layer structure and associated fabrication sequence that can be used to make the devices on a common substrate. In other words, n type and p type contacts, critical etches, etc. can be used to realize one or more of the devices simultaneously on a common substrate. Features of the epitaxial structure include 1) a bottom n-type layer structure, 2) a top p-type layer structure, and 3) an n-type modulation doped quantum well interface and a p-type modulation doped quantum well interface disposed between the bottom n-type layer structure and the top p-type layer structure. N-type and p-type ion implants are used to contact the n-type and p-type modulation doped quantum well interfaces, respectively. N-type metal contacts to the n-type ion implants and the bottom n-type layer structure. P-type metal contacts to the p-type ion implants and the top p-type layer structure. The epitaxial layer structure can be realized with a material system of group III-V materials (such as a GaAs/AlGaAs). The n-type modulation doped quantum well interface includes a relatively thin layer of highly doped n-type material (referred to herein as an "n+ charge sheet") spaced from one or more quantum wells by an undoped spacer layer. The p-type modulation doped quantum well interface includes a relatively thin layer of highly doped p-type material (referred to herein as a "p+ charge sheet") spaced from one or more quantum wells by an undoped spacer layer. The n+ charge sheet is disposed above the quantum well(s) of the n-type modulation doped quantum well interface adjacent the top p-type layer structure. The p+ charge sheet is disposed below the quantum well(s) of the p-type modulation doped quantum well interface adjacent the bottom n-type layer structure. One or more spacer layers are disposed between the quantum well(s) of the n-type modulation doped quantum well interface and the one or more quantum well(s) of the p-type modulation doped quantum well interface. A bottom dielectric distributed bragg reflector (DBR) mirror can be formed below the bottom n-type layer structure. The bottom DBR mirror can be formed from alternating layers of AlAs and GaAs. The AlAs layers are subjected to high temperature steam oxidation to produce the compound $Al_xO_y$, so as to form the bottom DBR mirror. A top dielectric mirror can be formed above the top p-type layer structure. The top dielectric mirror can be formed from alternating layers of $SiO_2$ and a high refractive index material such as silicon. The bottom and top mirrors provide for vertical confinement of light. The top dielectric mirror can cover the sidewalls of the device structure to provide for lateral confinement of light as needed.

POET can be used to construct a variety of high performance transistor devices, such as complementary NHFET and PHFET unipolar devices as well as n-type and p-type HBT bipolar devices. POET can also be used to construct a variety of optoelectronic devices which include:

a thyristor VCSEL laser;
an NHFET laser;
an PHFET laser;
a thyristor optical detector;
an NHFET optical detector;
a PHFET optical detector;
a semiconductor optical amplifier (SOA) or a linear optical amplifier (LOA) based on either one (or both) of the n-type and p-type quantum well interfaces;
an absorption (intensity) optical modulators based on either one (or both) of the n-type and p-type quantum well interfaces;
a phase modulator based on either one (or both) of the n-type and p-type quantum well interfaces;
a waveguide switch; and
a passive waveguide.

It is worth noting that the approach described above couples SMFs to in-plane waveguides that guide optical signals in the plane of the photonic IC 105, but it can be used equally as well for a multi-mode fiber optic (MMF). For the case of coupling to an MMF, an additional fiber element is required such as a photonic lantern which adiabatically converts the MMF signal to a SMF signal. The additional fiber element interfaces by evanescent coupling to the ECG section 113 of the photonic IC 105 as described above.

There have been described and illustrated herein several embodiments of a fiber optic coupler array and corresponding methods of fabrication. While particular embodiments of the invention have been described, it is not intended that the invention be limited thereto, as it is intended that the invention be as broad in scope as the art will allow and that the specification be read likewise. Thus, while particular configurations of the ECG and SSC sections of the coupler waveguides have been disclosed, it will be appreciated that other configurations of the ECG and SSC sections of the coupler waveguides can be used as well. In addition, while particular types of photonic integrated circuits have been disclosed, it will be understood that other photonic circuits can be used. Also, while particular bump bonding and packaging configurations have been disclosed, it will be recognized that other wafer level bonding and packaging configurations could be used as well. It will therefore be appreciated by those skilled in the art that yet other modifications could be made to the provided invention without deviating from its spirit and scope as claimed.

What is claimed is:

1. An assembly comprising:

a plurality of optical fiber waveguides each having a waveguide core;

a photonic integrated circuit that includes a plurality of in-plane waveguide structures corresponding to said plurality of optical fiber waveguides; and a substrate that is bonded to said photonic integrated circuit, wherein said substrate includes a plurality of grooves that support said plurality of optical fiber waveguides;

wherein portions of said plurality of optical fiber waveguides that are supported by said grooves of said substrate define a corresponding plurality of flat surfaces that are spaced radially from the waveguide cores of said plurality of optical fiber waveguides and that extend parallel to the waveguide cores along the lengthwise dimension of the optical fiber waveguides; and wherein said photonic integrated circuit includes a plurality of passive waveguide structures that correspond to both said plurality of in-plane waveguide structures of said photonic integrated circuit and said plurality of optical fiber waveguides, each passive waveguide structure including a first coupling section that interfaces to the flat surface of the corresponding optical fiber waveguide and a second coupling section that interfaces to the corresponding in-plane waveguide structure of said photonic integrated circuit, wherein said first coupling section is configured to provide for evanescent coupling of optical signals into or from the corresponding optical fiber waveguide, and the second coupling section is configured to provide for adiabatic spot-size conversion of optical signals between the first coupling section and the corresponding in-plane waveguide structure of said photonic integrated circuit.

2. An assembly according to claim 1, wherein:

said grooves are V-shaped.

3. An assembly according to claim 1, wherein:

a gel mechanically fixes the optical fiber waveguides within the grooves of said substrate.

4. An assembly according to claim 1, wherein:

the substrate comprises a silicon wafer.

5. An assembly according to claim 1, wherein:

the substrate and said photonic integrated circuit both comprise a plurality of metal bump bonds that cooperate to provide both bonding and electrical connections between the substrate and said photonic integrated circuit.

6. An assembly according to claim 5, wherein:

the substrate provides for electrical input and output with respect to said photonic integrated circuit.

7. An assembly according to claim 1, wherein:
the mode size of the optical signals propagating in the optical fiber waveguides is larger than the mode side of the optical signals propagating in the in-plane waveguide structures of said photonic integrated circuit.

8. An assembly according to claim 1, wherein:
the waveguide cores of the optical fiber waveguides are realized from a material with a first refractive index; and
the first coupling section and the second coupling section of the passive waveguide structures of said photonic integrated circuit are realized from a material with a second refractive index that matches said first refractive index.

9. An assembly according to claim 1, wherein:
the waveguide cores of the optical fiber waveguides are realized from silicon dioxide; and
the first coupling section and the second coupling section of the passive waveguide structures of said photonic integrated circuit are also realized silicon dioxide.

10. An assembly according to claim 1, wherein:
the first coupling section of each respective passive waveguide structure has a square cross section with a size that corresponds to size of the optical mode of the corresponding optical fiber waveguide.

11. An assembly according to claim 1, wherein:
the second coupling section of each respective passive waveguide structure defines a number of distinct levels that overlap one another vertically along the length of the second coupling section, wherein each level has opposed sidewalls that taper laterally in width.

12. An assembly according to claim 11, wherein:
the second coupling section includes bottom, intermediate and top levels that extend along the length of the second coupling section;
wherein the top level has a height that corresponds to height of the first coupling section and opposed sidewalls that taper laterally from a width $W_I$ that corresponds to width of the first coupling section to a width $W_1$,
wherein the second level has a portion that extends beyond the top level with opposed sidewalls that taper laterally from a width $W_M$ to a width $W_2$ adjacent the corresponding in-plane waveguide structure; and
wherein the third level has a portion that extends beyond the top level with opposed sides that taper laterally from the width $W_M$ to a width $W_0$;
wherein $W_2 < W_1 < W_M < W_I$, and $W_0 < W_M$.

13. An assembly according to claim 1, wherein:
said photonic integrated circuit is realized with a material system of group III-V materials.

14. An assembly according to claim 1, wherein:
said photonic integrated circuit is realized from an epitaxial layer structure that includes an n-type modulation doped quantum well interface offset vertically from a p-type modulation doped quantum well interface.

15. An assembly according to claim 1, wherein:
said plurality of flat surfaces are formed by mechanically polishing said plurality of optical fiber waveguides.

\* \* \* \* \*